(12) United States Patent
Carpenter et al.

(10) Patent No.: US 7,454,389 B2
(45) Date of Patent: Nov. 18, 2008

(54) SCHEDULING AND DECISION SYSTEM

(75) Inventors: Tom Carpenter, Costa Mesa, CA (US); Clayton Monkus, Marietta, GA (US)

(73) Assignee: Nmetric, LLC, Costa Mesa, CA (US)

( * ) Notice: Subject to any disclaimer, the term of this patent is extended or adjusted under 35 U.S.C. 154(b) by 782 days.

(21) Appl. No.: 10/470,354

(22) PCT Filed: Jan. 7, 2003

(86) PCT No.: PCT/US03/00635

§ 371 (c)(1),
(2), (4) Date: Oct. 25, 2004

(87) PCT Pub. No.: WO2004/053789

PCT Pub. Date: Jun. 24, 2004

(65) Prior Publication Data

US 2005/0055693 A1     Mar. 10, 2005

Related U.S. Application Data

(60) Provisional application No. 60/432,498, filed on Dec. 10, 2002.

(51) Int. Cl.
*G06N 5/00*     (2006.01)

(52) U.S. Cl. .......................................... 706/45; 702/188
(58) Field of Classification Search .................. 706/45; 702/188; 379/221.11
See application file for complete search history.

(56) References Cited

U.S. PATENT DOCUMENTS

| | | | |
|---|---|---|---|
| 6,404,880 B1 * | 6/2002 | Stevens .................. | 379/221.11 |
| 6,577,988 B1 * | 6/2003 | Travagline et al. .......... | 702/188 |
| 2002/0065885 A1 | 5/2002 | Buonanno et al. ........... | 709/205 |
| 2002/0174050 A1 | 11/2002 | Eynard et al. .................. | 705/37 |
| 2002/0194053 A1 | 12/2002 | Barrett et al. .................. | 705/10 |
| 2002/0198616 A1 | 12/2002 | Crampton et al. ............. | 700/99 |

* cited by examiner

*Primary Examiner*—Wilbert L Starks, Jr.
(74) *Attorney, Agent, or Firm*—Fish & Associates, PC

(57) ABSTRACT

The inventive subject matter herein is directed toward improved scheduling and planning system (200) in which computer implemented software uses a hierarchical selection list to select at least one of a plurality of unconnected users and contact the selected user(s) as a function of an event (110). Another aspect of the inventive subject matter includes an improved decision and/or scheduling system (100) that has soft fields for describing resources. Further aspects utilize a hierarchical soft field configuration.

19 Claims, 2 Drawing Sheets

SCHEDULING AND DECISION SYSTEM

This application claims the benefit of U.S. provisional application No. 60/432,498 filed Dec. 10, 2002, incorporated herein by reference in its entirety.

FIELD OF THE INVENTION

The field of the invention is scheduling and decision making systems.

BACKGROUND OF THE INVENTION

In manufacturing and other applications, scheduling and decision making systems use computers to mange the increasing quantity of data. Traditionally, the cost of data storage was relatively expensive, but today the cost of storing data is so low that in most instances the quantity of data is not cost prohibitive. What can be cost prohibitive, however, is the time and effort required to filer the data and to get relevant information to the appropriate user in a timely manner.

In batch systems, filtering of data can be accomplished either automatically or manually. Automatic filtering may take the form of an instruction hard coded in a program, an input parameter to a program (e.g. a selection criteria), or a routing instruction that instructs the system to route particular output to a particular user. Manual filtering of data is generally performed by a person and can be as simple as discerning the appropriate user to receive a computer generated report and giving the report to that user. Systems which utilize manual filtering may also utilize bins or mail boxes that store hard copy reports for an associated user. A persisting problem, however, with batch systems, is that massive reports are often created and much of the information in the report is either superfluous, out-dated, or intended for more than one user.

Online reporting and display of data alleviated some of the problems associated with massive hard copy reports and timeliness of data by allowing users to view real time or near real time data using a display screen. Additionally, online systems empowered users with the ability to make decisions that more accurately reflected current conditions. Still, there were problems getting the right information to the right person at the right time. At times, the right person was not available or access to the right information was limited. Even still, there were instances in which too much information was available and this added to the time needed to make a timely decision. There remains a need for improved scheduling and decision making systems and methods which facilitate getting the right information to the right people at the right time.

SUMMARY OF THE INVENTION

The inventive subject matter herein is directed toward improved scheduling and planning system in which computer implemented software uses a hierarchical selection list to select at least one of a plurality of unconnected users and contact the selected user(s) as a function of an event. Unconnected means that the user is not physically situated such that online access to the scheduling system is readily available. For example, an unconnected user may be a user of the scheduling system who is physically located outside the local network, a supplier of a product used by the scheduling system, or a customer of the entity controlling the scheduling system.

With regard to hierarchy, a selection list advantageously correlates a plurality of users with a severity of a problem. It is contemplated that an event may cause a scheduling or decision making problem. Such an event may include the failure of a machine, the absence of an employee, the shortage of a raw material, and so on. Correlation of a user with a severity of a problem may include selecting a user that is most appropriate to solve a particular problem. For instance if the problem is a shortage of a raw material that will cause a delay in production of a product for an important customer, it may be appropriate to select a purchasing manager who can leverage his position with vendors to get expedited delivery of a product.

A selection list may alternatively and/or additionally correlate users with contacting methods. By adding a further layer of correlation, it may be easier to contact the appropriate person to solve a particular problem or address a particular event. Thus, hierarchical selection may include multiple layers (tiers) of correlation in which users are correlated with type of problem, severity of problem, and contacting method.

Another aspect of the inventive subject matter includes an improved decision and/or scheduling system that has soft fields for describing resources. A soft field is a field that is created dynamically by a user. Thus, not only do users input values for fields, but they actually create fields. In some embodiments, soft fields will be sortable and/or searchable enabling users to further define the type and extent of the data they wish to receive. It should be noted that soft fields may be used for locations, processes, materials, or most any resource.

Hierarchical soft field configuration can be useful in almost any planning and/or scheduling system, especially those that assume limited requirements such as ERP (enterprise resource planning), MRPII (manufacturing resource planning), and so on.

DETAILED DESCRIPTION

Figure 1:
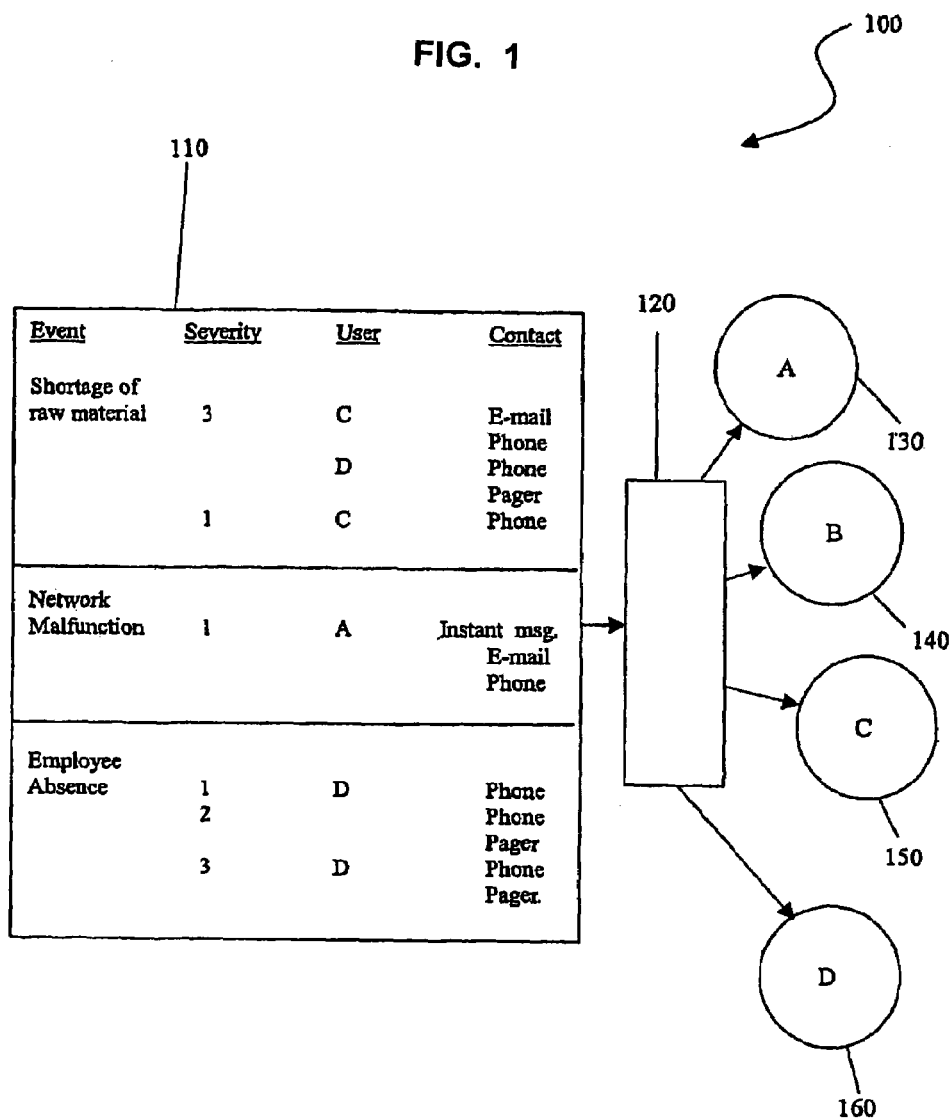
FIG. 1 is a schematic of an event driven scheduling system having a hierarchical selection list.

In FIG. 1, an event driven scheduling system 100 generally comprises a hierarchical selection list 110, computer implemented software 120, and a plurality of unconnected users 130-160.

A scheduling system is a manipulation of data which results in a planned task. The manipulation of data typically includes input, utilization, and display of data, and the planned task typically includes a description and time of performance for the task.

A preferred hierarchical selection list can take the form of a hardcopy list or a virtual list, but either way, a hierarchical aspect of the list includes levels of data items that have some sort of relationship (e.g. chain or pointer) to one another. The hierarchical selection list 110 of FIG. 1, for instance, has a relationship between an event, a severity of a problem or event, an unconnected user, and a contact method. In a preferred class of embodiments, hierarchy includes a step down approach that begins with an event which correlates to a severity of a problem which further correlates to an unconnected user and finally to a plurality of contacting methods for contacting the unconnected user.

A hierarchical selection list 110 has fields for event, severity, user, and contact. It should be appreciated that additional, fewer, or other fields may be part of a hierarchical selection list. For example, it may be useful for a hierarchical selection list to have a field to indicate whether an affected customer is a preferred or important customer. Another example of a field that can be added to a hierarchical selection list is e-mail address, phone number, pager number, etc. While such fields may be maintained in a file other than one of those associated with the hierarchical selection list, it may be advantageous to have those fields in a file associated with a hierarchical selection list.

A computer implemented software 120 is a set of computer interpretable instructions. The computer implemented software 120 uses the hierarchical selection list 110 to select at least one of a plurality of users and contact the selected user(s) as a function of an event. It is contemplated that a computer includes a desk top device, a notebook, a PDA, a cell phone, and so on.

Unconnected users 130-160 are those users of the scheduling system that are not physically situated such that access to the scheduling data is readily available. For example, an unconnected user may be a user of the scheduling system who is physically located outside the local network, a supplier of a product used by the scheduling system, or a customer of the entity controlling the scheduling system.

Consider the following example with reference to FIG. 1. A foreman on the shop floor of a manufacturing company is notified that an unexpected shortage of a raw material has occurred (an event, also sometimes referred to as a problem). The event is either manually entered into the scheduling system 100 or is automatically sensed or detected by the system or a related module, but in any case the system 100 has been notified of the event. A severity of the problem is either manually input or automatically determined by the system or some related module. It should be pointed out that sensing of an event and it's associated severity can be accomplished using a sensing device (e.g. optical or electromechanical). Sensors can also be used to inspect products to determine whether quality standards have been met.

Continuing this example, within a very short time (2, 10, 30 seconds) of notification of the event, the computer generated software 120 selects a user or set of users and correlates the user or users with the severity. In this case, say the severity is 3 (a high severity). Thus, user C 150 is selected as a function of the event and severity.

Contemplated methods of contact can include pager, cell phone, e-mail, instant message, broadcast to a mobile telematics device, and messenger. In this example, the optimal method of contacting user C 150 for this severity and this event is by e-mail. Preferably, the system 100 generates an e-mail to user C 150 advising her of the problem. It is contemplated that an e-mail or other message can contain information such as the event, the severity of the problem, the customer involved, a work-order number, the due date of the scheduled task, the time of the problem, the users contacted, threshold time to respond, and soft fields information (discussed infra). Additionally, it may be advantageous to utilize a backup contact method (e.g. phone) if the primary (e.g. e-mail) method of contact is not responded to within a maximum threshold of time. A backup or secondary user can also be contacted. In other embodiments, more than one user can be contacted simultaneously and/or more than one method of contacting can be used simultaneously. Thus, user D can be an additional primary user or a secondary user depending on parameters that are input to the system.

Figure 2:
FIG. 2 is a schematic of a hierarchical soft field list.

Referring now to FIG. 2, an improved decision and/or scheduling system generally comprises a data model 200 having soft fields for describing resources. These soft fields are also referred to herein as parameter/values with the parameter equating to the type of resource and the value equating to the data contained in the field. Thus, an exemplary parameter/value pair is "maximum temperature/32° F.".

A soft field is generally created by a user through use of a dynamic schema utility. It should be noted that a soft field involves more than mere initialization of a pre-existing field on a database schema, it involves the creation of such a field. Soft fields are used to give users flexibility in determining the fields they use to describe resources. Moreover, use of soft fields reduces the number of fields that are not used (i.e. contain blanks). In some embodiments, soft fields will be sortable and/or searchable enabling users to further define the type and extent of the data they wish to receive. It should be noted that soft fields may be used for most any resource including location, process, material, man hours, and so on.

Hierarchical soft field configuration can be useful in almost any planning and/or scheduling system, especially those that assume limited requirements such as ERP (enterprise resource planning) and MRPII systems. Hierarchical soft fields can be used to store information that is included in a message sent to a user as a function of an event.

Display of parameters is typically accomplished using scroll down menus. By reviewing the items displayed in the scroll down menu, one can determine whether a particular parameter has already been established. It should be noted that multiple entries can exist having the same parameter, as long as the associated value is different. For example, parameter/value "milling machine capacity/10 units/min" can co-exist with a parameter/value entry of "milling machine capacity/4 units/min". It is contemplated that a user of the system will determine which of the parameter/value pairs is appropriate for a given entry.

Thus, specific embodiments and applications of scheduling and decision systems and methods have been disclosed. It should be apparent, however, to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

What is claimed is:

1. An improved manufacturing scheduling system, wherein the improvement comprises:

a sensing device configured to sense a problematic event and a severity associated with the event, and configured to notify a software;

a computer memory storing a hierarchical selection list; and the computer memory storing the software having instructions that execute on a computer to use the list to select at least one of a plurality of unconnected users, and to contact the selected user(s) as a function of the problematic event within 30 seconds of receiving a notification of the problematic event.

2. The system of claim 1, wherein the software is configured to use the selection list to correlate more than one user with the severity of the problematic event.

3. The system of claim 1, wherein the software is configured to use the selection list to correlate the plurality of users with a plurality of contacting methods.

4. The system of claim 3, wherein the software is configured to use the selection list to correlate the plurality of contacting methods with the severity of the problematic event.

5. The system of claim 1, wherein the unconnected user is outside the system.

6. The system of claim 1, wherein the unconnected user is a supplier.

7. The system of claim 1, wherein the unconnected user is a support person.

8. The system of claim 1, further comprising a manufacturing decision system, the decision system wherein the computer memory stores a database representing a data model that includes soft fields describing manufacturing resources.

9. The system of claim 8 wherein the soft fields are associated in hierarchical manner.

10. The system of claim 8 wherein the soft fields are sortable and searchable.

11. The system of claim 8 wherein the decision system further comprises additional soft fields for locations.

12. The system of claim 8 wherein the decision system further comprises additional soft fields for processes.

13. The system of claim 8 wherein at least some of the resources are materials.

14. The system of claim 8 wherein the decision system further comprises a computer implementation of a planning algorithm that assumes limited requirements.

15. The system of claim 8 wherein the decision system further comprises a computer implementation of a scheduling algorithm that assumes limited requirements.

16. A method of scheduling in a manufacturing company, comprising:
    creating a hierarchical selection list comprising a problematic event, at least one unconnected user identification associated with the event, and at least one contact method for the unconnected user;
    receiving a notification of an occurrence of the event;
    selecting the unconnected user by correlating the user with the event and with the contact method using the hierarchical selection list; and
    notifying the unconnected user using the contact method within 30 seconds of receiving the notification of the event.

17. The method of claim 16, further comprising correlating the user with a severity of the problematic event using the hierarchical selection list.

18. The method of claim 16, wherein the step of notifying occurs within 10 seconds of receiving the notification.

19. The method of claim 16, further comprising the step of automatically sensing the event through a sensing device.

* * * * *